(12) United States Patent
Chang et al.

(10) Patent No.: US 8,179,627 B2
(45) Date of Patent: May 15, 2012

(54) FLOATING GUARD BAND FOR SHINGLE MAGNETIC RECORDING

(75) Inventors: Dar-Der Chang, San Jose, CA (US); Ken Hong, San Jose, CA (US); Byeung Jun Lee, Saratoga, CA (US); Xin Guo, Santa Clara, CA (US)

(73) Assignee: Seagate Technology International, Grand Cayman (KY)

( * ) Notice: Subject to any disclaimer, the term of this patent is extended or adjusted under 35 U.S.C. 154(b) by 0 days.

(21) Appl. No.: 12/797,963

(22) Filed: Jun. 10, 2010

(65) Prior Publication Data
US 2011/0304935 A1    Dec. 15, 2011

(51) Int. Cl.
*G11B 5/09* (2006.01)
(52) U.S. Cl. ............... 360/48; 360/31; 360/53; 360/62; 360/77.02
(58) Field of Classification Search ................. None
See application file for complete search history.

(56) References Cited

U.S. PATENT DOCUMENTS

| | | | | |
|---|---|---|---|---|
| 4,839,753 | A | * | 6/1989 | Ide et al. ........................ 360/48 |
| 4,942,486 | A | * | 7/1990 | Kutaragi et al. ................ 360/48 |
| 5,903,411 | A | * | 5/1999 | Tomita et al. ............. 360/78.14 |
| 5,917,669 | A | * | 6/1999 | Johnson et al. ................ 360/53 |
| 7,082,007 | B2 | * | 7/2006 | Liu et al. .................. 360/77.02 |
| 7,486,460 | B2 | * | 2/2009 | Tsuchinaga et al. ............ 360/48 |
| 7,490,212 | B2 | * | 2/2009 | Kasiraj et al. ................. 711/172 |
| 2005/0071537 | A1 | * | 3/2005 | New et al. ..................... 711/100 |
| 2006/0227449 | A1 | * | 10/2006 | Che et al. ........................ 360/75 |
| 2008/0304172 | A1 | * | 12/2008 | Bi et al. ......................... 360/48 |
| 2010/0232057 | A1 | * | 9/2010 | Sanvido et al. ............ 360/78.04 |

* cited by examiner

*Primary Examiner* — Dismery Mercedes

(57) ABSTRACT

A hard disk drive that includes a disk with data written onto a plurality of tracks, a spindle motor that rotates the disk, and a head that is coupled to the disk. The disk drive also includes a circuit that writes data onto a first writable shingle band of tracks if the first writable shingle band is adjacent to a guard band of tracks. The first writable shingle band includes a number of tracks that is a function of a head width. The guard band of tracks is capable of becoming a writable shingle band. Changing the designation of a shingle band between guard and writable creates floating guard bands. The creation of floating guard bands allows for the writing of a single band without having to move and restore adjacent tracks until reaching a fixed guard band as required in the prior art.

12 Claims, 7 Drawing Sheets

FLOATING GUARD BAND FOR SHINGLE MAGNETIC RECORDING

BACKGROUND OF THE INVENTION

1. Field of the Invention

The present invention relates to a technique for writing data onto a disk of a hard disk drive.

2. Background Information

Hard disk drives contain a plurality of magnetic heads that are coupled to rotating disks. The heads can magnetize and sense the magnetic fields of the disks to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains at least one data field.

It is generally desirable to increase the storage capacity of a hard disk drive. Storage can be increased by reducing the width of each track. As shown in FIG. 1. the width of a track 1 may be less than the width of a head 2. When the head writes onto a target track it may also write onto adjacent tracks, corrupting the data on those tracks. To prevent adjacent track corruption the data from the adjacent tracks are moved to another location before writing onto the target track. The data is then restored for the adjacent track. Restoring data onto the adjacent track requires another cycle of moving and restoring data for the next adjacent track. The disk may include fixed guard bands to terminate the process of moving and restoring data on adjacent tracks. The guard bands contain no data. The process of moving the data from adjacent tracks and then writing data onto a target track is repeated until the head reaches the guard band. Because the guard band does not contain valid data there is no need to move data before writing to the target track. The guard bands are typically located every hundred tracks on the disk. The process of moving and then restoring adjacent tracks can be an inefficient way to write data, particularly when writing random data that may only require a few tracks. For example, writing to a track in the center of a data region requires the continued process of moving and restoring adjacent tracks until the head reaches a guard band.

BRIEF SUMMARY OF THE INVENTION

A hard disk drive that includes a disk with data written onto a plurality of tracks, a spindle motor that rotates the disk, and a head that is coupled to the disk. The disk drive also includes a circuit that writes data onto a first writable shingle band of tracks if the first writable shingle band is adjacent to a guard band of tracks. The first writable shingle band includes a number of tracks that is a function of a head width. The guard band of tracks is capable of becoming a writable shingle band.

DETAILED DESCRIPTION

Disclosed is a hard disk drive that includes a disk with data written onto a plurality of tracks, a spindle motor that rotates the disk, and a head that is coupled to the disk. The disk drive also includes a circuit that writes data onto a first writable shingle band of tracks if the first writable shingle band is adjacent to a guard band of tracks. The first writable shingle band includes a number of tracks that is a function of a head width. The guard band of tracks is capable of becoming a writable shingle band. Changing the designation of a shingle band between guard and writable creates floating guard bands. The creation of floating guard bands allows for the writing of a single band without having to move and restore adjacent tracks until reaching a fixed guard band as required in the prior art.

Figure 1:
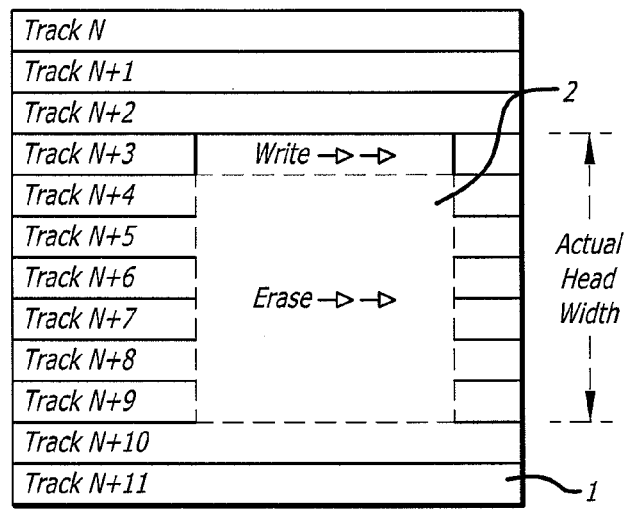
FIG. 1 is an illustration showing the relationship of a head width to track widths in the prior art.
Figure 2:
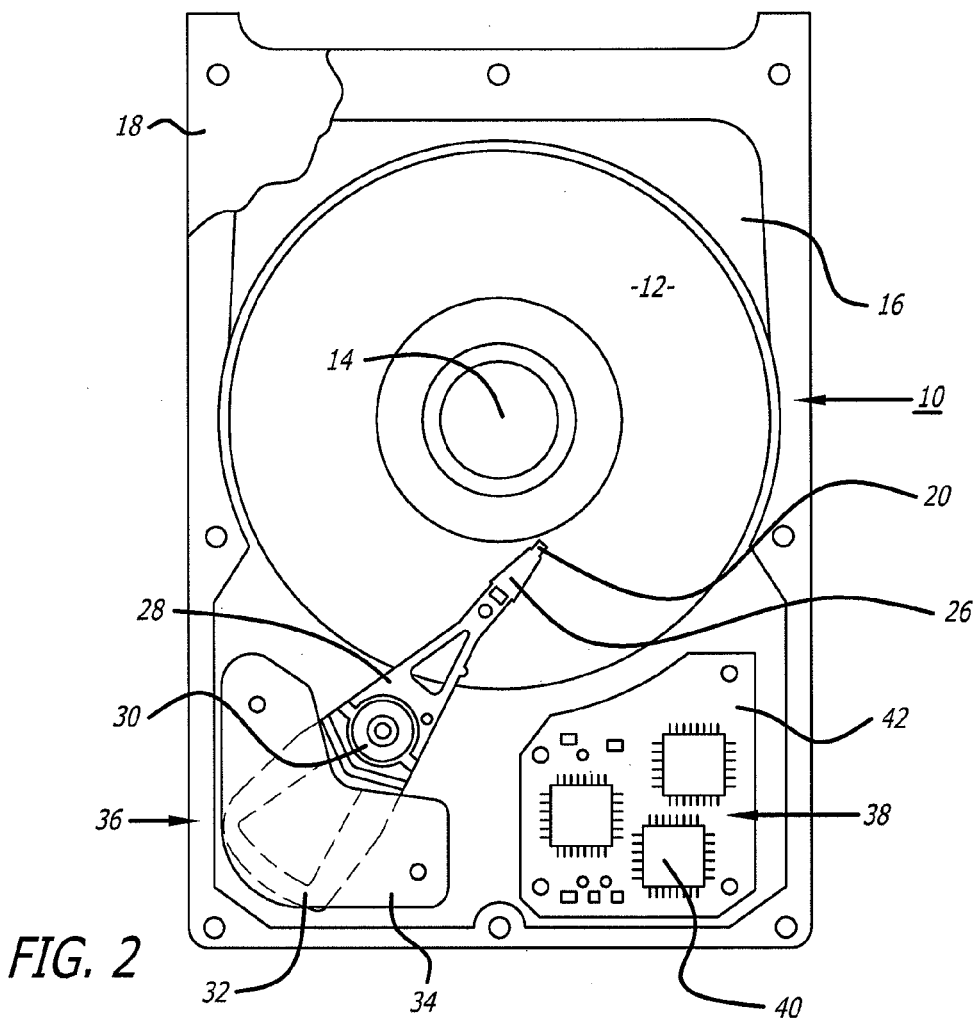
FIG. 2 is a top view of a hard disk drive.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
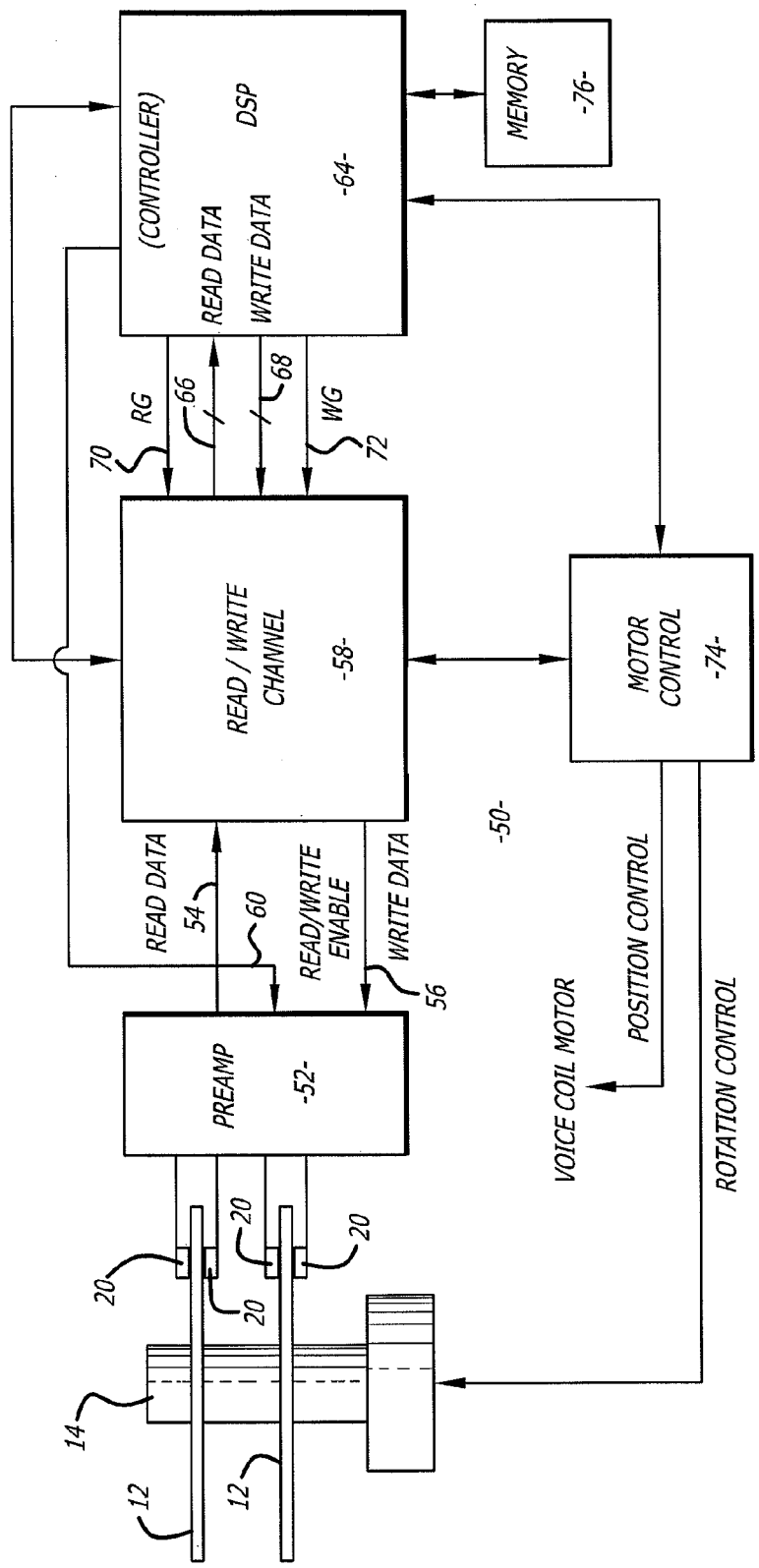
FIG. 3 is a schematic of an electrical system for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine(s), including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a nonvolatile memory device 76. The memory 76 may contain the firmware and/or software routine(s) performed by the controller 64.

Figure 4:
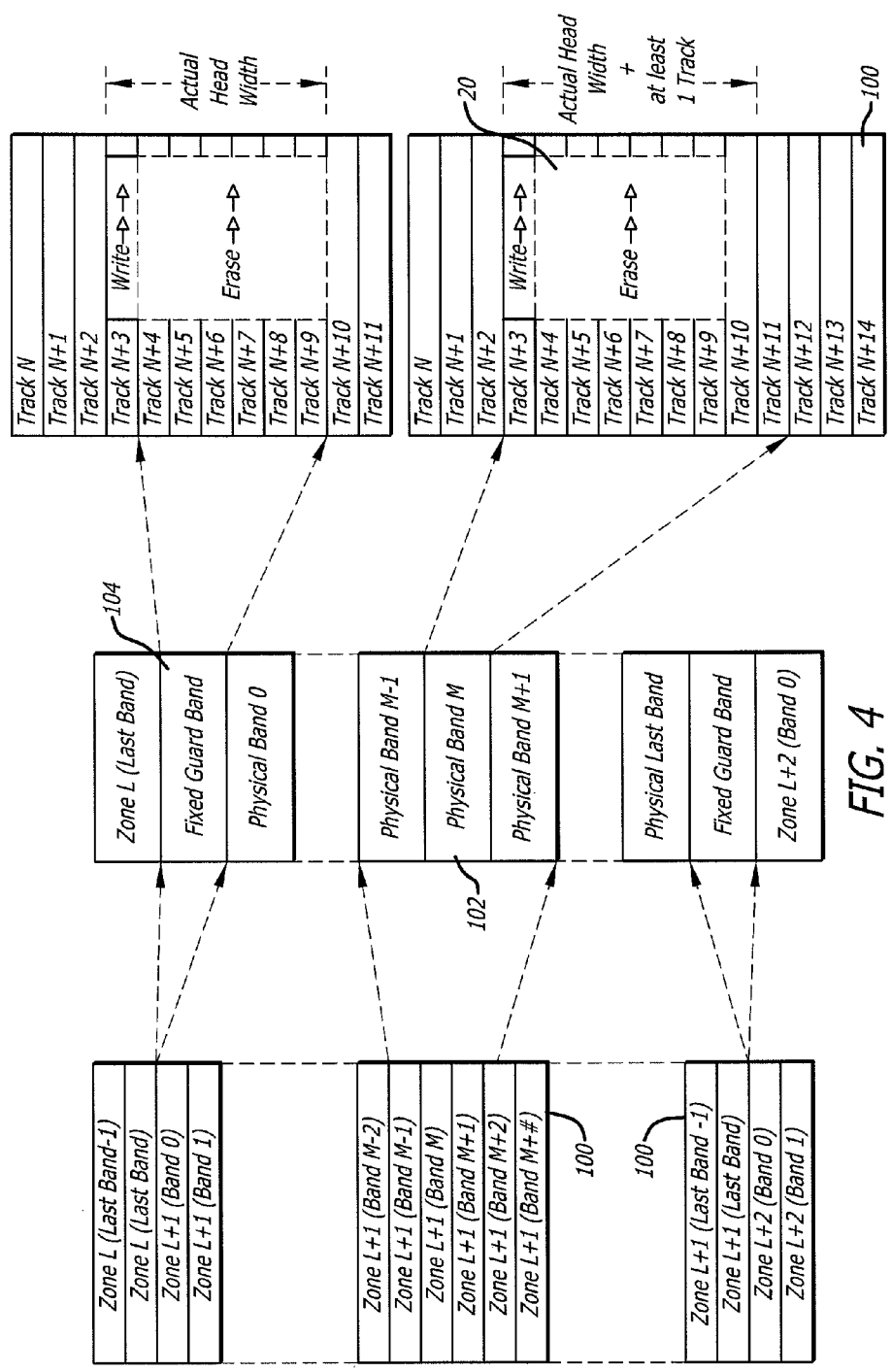
FIG. 4 is an illustration similar to FIG. 1 showing the allocation of bands in accordance with the present invention.

The controller 64 can write data onto the disk in accordance with a floating guard writing scheme. As shown in FIG. 4 the disk may contain a plurality of tracks 100. A certain number of tracks may be grouped as a physical band 102. The physical bands 102 may include tracks that contain data. The disk may also include fixed guard bands 104 that do not contain data. As shown the width of the head 20 is larger than the width of each track. When the head writes to a target track it will also cause corruption of adjacent tracks, indicated in the figure as an erase.

Figures 5A, 5B, 5C:
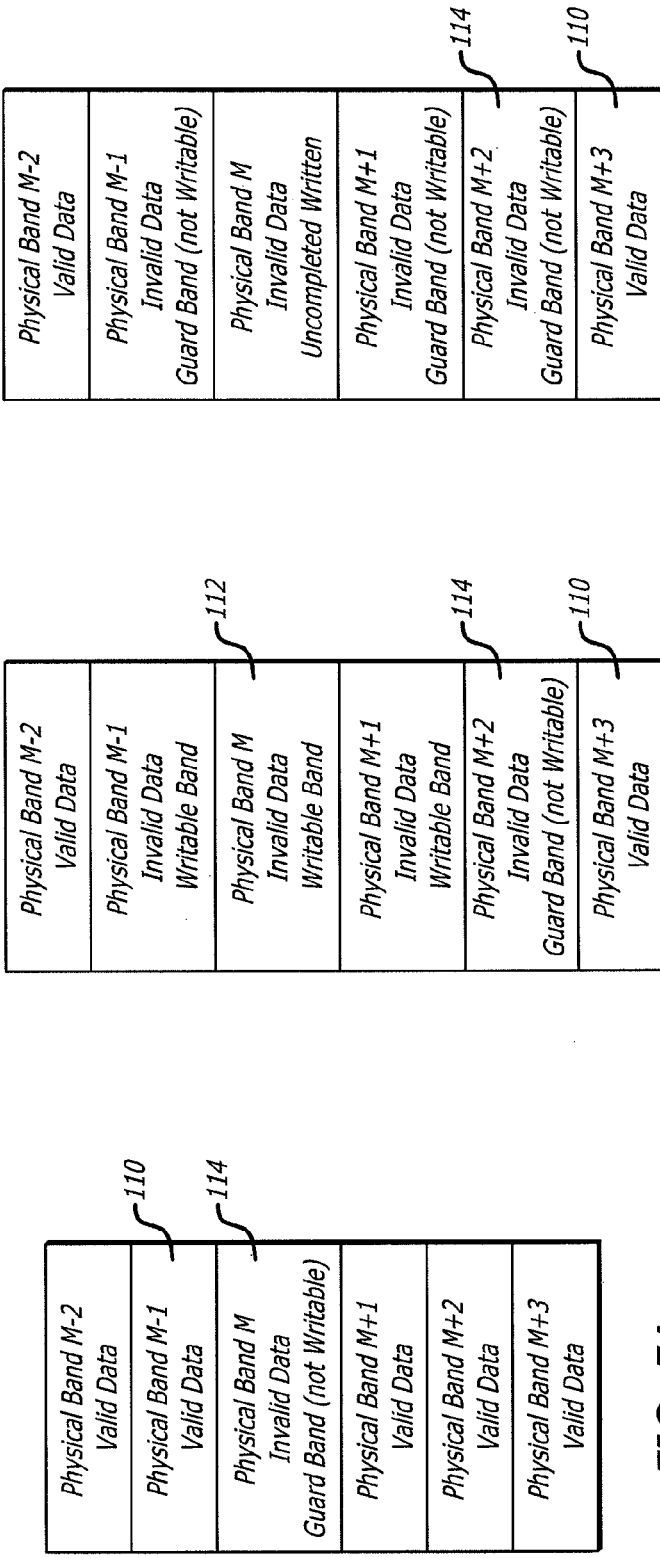
FIGS. 5A-C are illustrations showing the creation of floating guard bands.

As shown in FIGS. 5A-C the tracks may be grouped into shingle bands that may be designated as data bands 110, writable bands 112, or floating guard bands 114. A shingle band can be defined as including a number of tracks that is equal to the width of the head plus 1 additional track (see FIG. 4). The number of logical sectors for each band may not include defect sectors. The number of physical sectors may be larger than logical sectors and vary because of variations in the number of defect sectors per band. This may result in a band boundary that is not aligned with a track boundary. Because of track skew the first track of a following band may become corrupted. The additional track is added to avoid this corruption.

A data band is a shingle band that includes valid data. A guard band is a shingle band that includes invalid data. A writable band is a shingle band that includes invalid data and is adjacent to a guard band. A writable band may also be adjacent to another writable band as shown in FIG. 5B. If the writable band has incomplete data then the adjacent writable bands are designated guard bands. A guard band may be floating if it can be later designated as a writable band and be filled with valid data.

Figure 6:
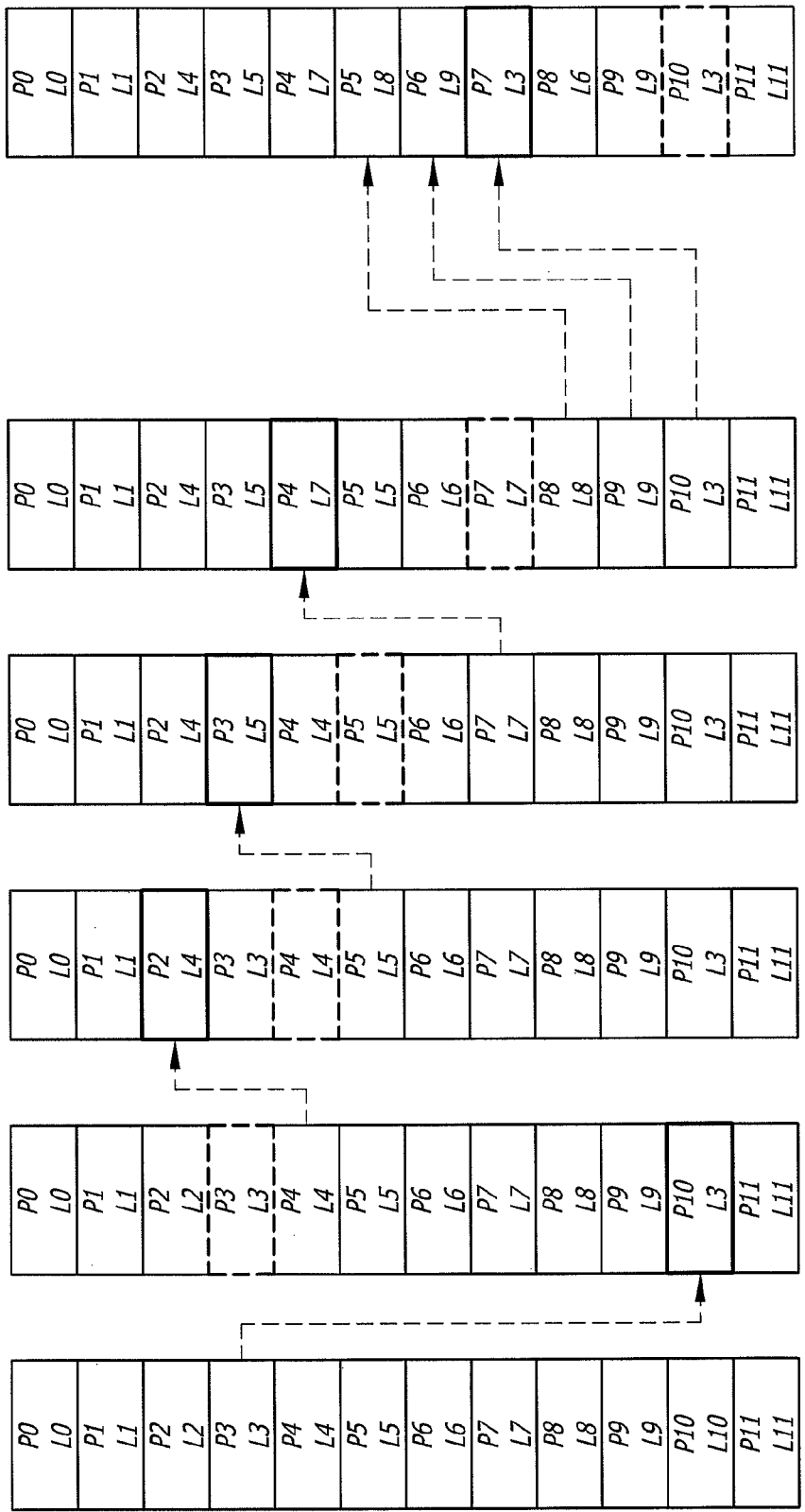
FIGS. 6 is an illustration showing a one-way mapping scheme using floating guard bands; and, FIGS. 7 is an illustration showing a round-trip mapping scheme using floating guard bands.

Data can be written into bands of tracks by creating adjacent floating guard bands. By way of example, data can be written with floating guard bands with a one-way mapping scheme. Generally speaking the method includes writing data to one or more writable bands. If the number of available writing bands is below a threshold the method invokes a house keeping routine. FIG. 6 shows a specific example of a housing keeping routine. The illustration shows a number of bands designated P0-P11. The bands may include data designated L0-L11. In this example, it is desirable to write data to band P2 which has been designated as a writable shingle band. Data must be moved from the adjacent band P3. First a writable band is identified, in this example it is P10. The data from P3, the band adjacent to P2, is written into P10. P3 is then designated as a floating guard band. Data is then written into band P2. Unlike the prior art there is no requirement to move and restore adjacent tracks until reaching a fixed guard band. The house keeping routine may continue to clump data bands and guard bands together. This is shown in the illustration where data is moved from P4 to P2, P5 to P3, and P7 to P4. The bands P4 and P5 are designated guard bands after the data is moved so that data can be written into P3 and P4, respectively. Finally, data is moved from P8, P9 and P10 to P5, P6 and P7, respectively.

Figures 1, 7:
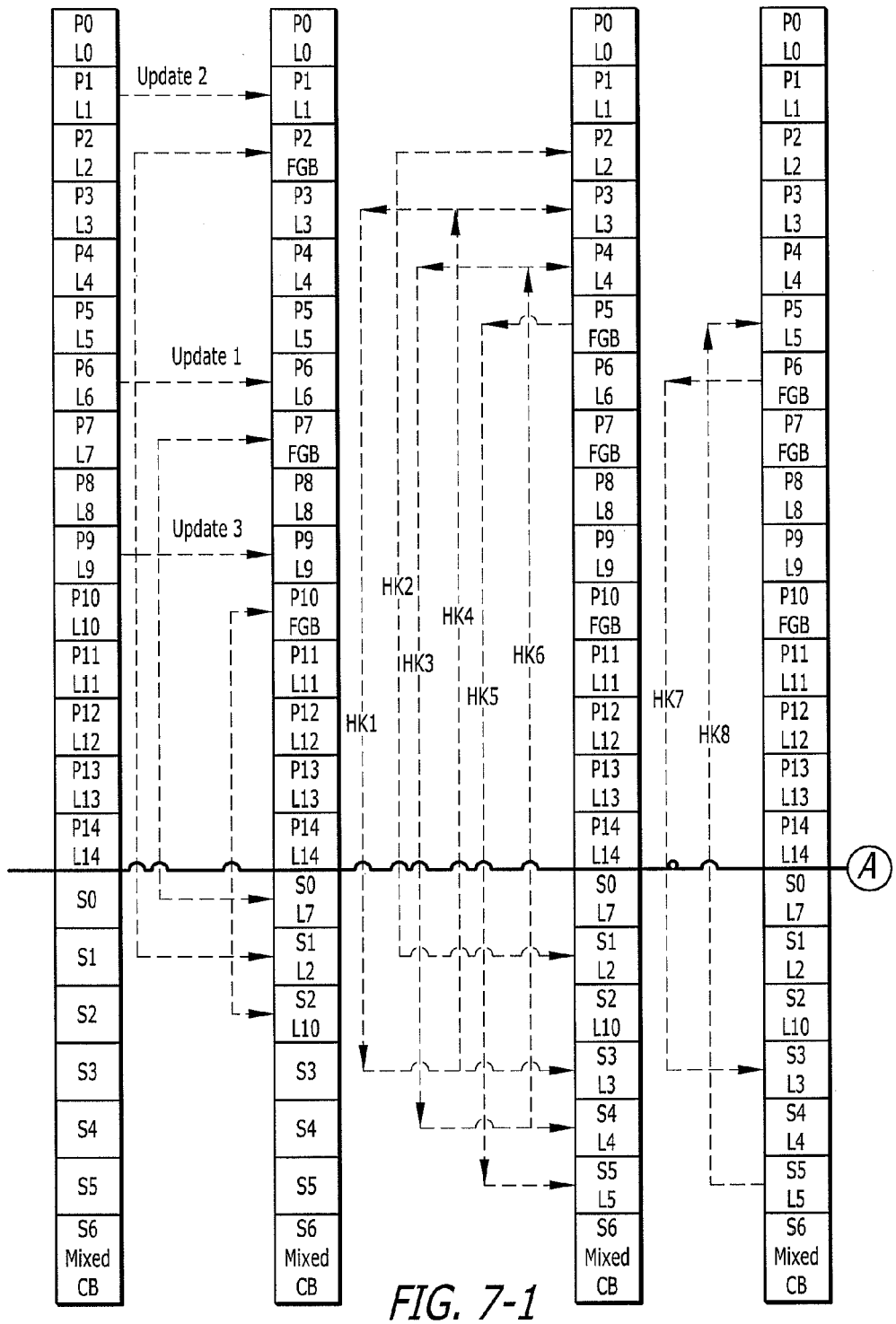
Figures 2, 7:
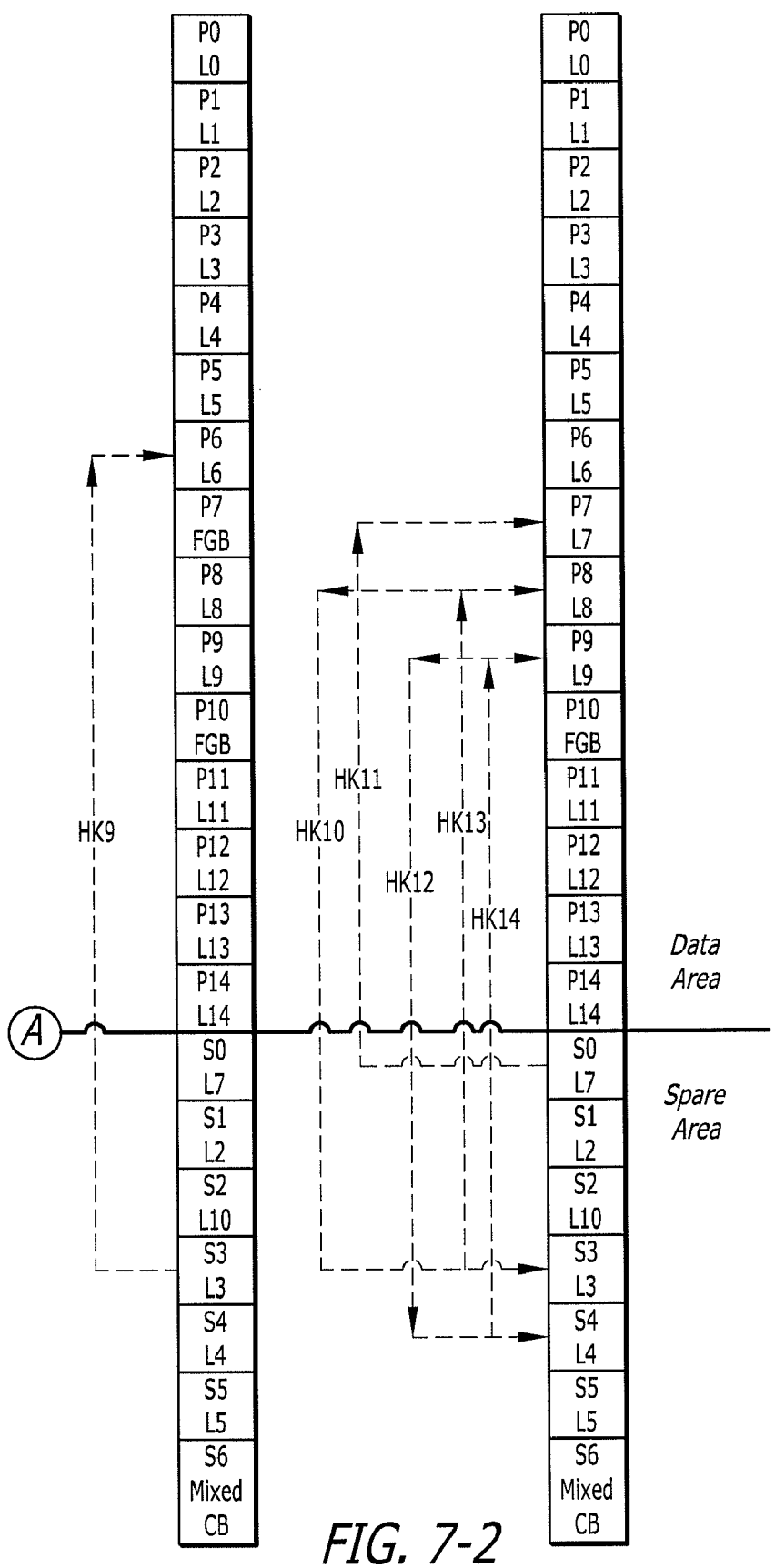

Data can also be written with a round-trip mapping scheme that utilizes spare bands. If the number of spare bands is below a threshold the process may perform a house keeping routine. One embodiment of the house keeping routine designates floating guard bands as fixed guard bands and writes data by moving and restoring adjacent tracks until the head reaches a fixed guard band. FIG. 7 shows an illustration of an alternative round-trip house keeping routine. In this example, it is desirable to write data into band P1. Data from the adjacent band is moved from band P2 into spare band S1. Data is then written into P1. To return the data to band P2, data from the adjacent band. P3 is first moved to spare band S3. The data from S1 is then written into P2 to complete the round trip of data in this band. The process of moving data into and from spare bands may be repeated to remove floating guard bands and/or increase the spare bands as shown in FIG. 7. This will improve efficiency when writing de-fragmented random data to one or more bands.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:
1. A hard disk drive, comprising:
a disk including valid data written onto a plurality of tracks adjacent a guard band of tracks for invalid data; a spindle motor that rotates said disk; a head coupled to said disk, said head has a width;
and a circuit for writing the valid data onto a first writable shingle band of the plurality of tracks, abutted to at least one track of the guard band of tracks, and
wherein: the first writable shingle band is designated as a floating guard band for valid data; and said circuit moves the valid data from said floating guard band to a second writable shingle band before writing the valid data onto said first writable shingle band.

2. The disk drive of claim 1, wherein said circuit writes said valid data from said second writable shingle back into said floating guard band.

3. The disk drive of claim 1, wherein said disk includes a fixed guard band.

4. The disk drive of claim 1, wherein said shingle band is equal to a width of said head plus 1 track width.

5. A hard disk drive, comprising: a disk including valid data written onto a plurality of tracks adjacent a guard band of tracks for invalid data; a spindle motor that rotates stud disk; a head coupled to said disk, said head has a width; and
circuit means for writing the valid data onto a first writable shingle band of the plurality of tracks, abutted to at least one track of the guard band; and wherein: the first writable shingle band is designated as a floating guard band for valid data; and said circuit means moves the valid data from said floating guard band to a second writable shingle band before writing the valid data onto said first writable shingle band.

6. The disk drive of claim 5, wherein said circuit means writes said valid data from said second writable shingle band back into said first writable shingle band.

7. The disk drive of claim 5, wherein said disk includes a fixed guard band.

8. The disk drive of claim 5, wherein said shingle band is equal to a width of said head plus 1 track width.

9. A method for writing data onto a disk of a hard disk drive, comprising: providing a disk with shingle bands of tracks with valid data adjacent a guard band of tracks for invalid data; rotating the disk with a spindle motor; coupling a head having a width with the disk; writing the valid data onto a first writable shingle band of the shingle band of tracks abutted to at least one track of the guard band; designating the first writable shingle band as a floating guard band for valid data;

and moving data from the floating guard band to a second writable shingle band before writing data onto the first writable shingle band.

10. The method of claim 9, further comprising writing the valid data from the second writable shingle back to the floating guard band.

11. The method of claim 9, wherein the disk includes a fixed guard band.

12. The method of claim 9, wherein the first writable shingle band is equal to a width of the head plus 1 track width.

* * * * *